M. SKORNESS.
FLOWER POT COVER.
APPLICATION FILED JULY 23, 1908.
915,897.
Patented Mar. 23, 1909.
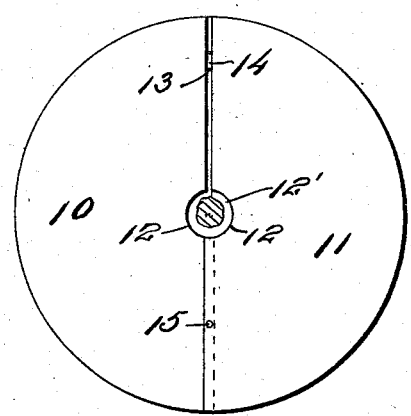
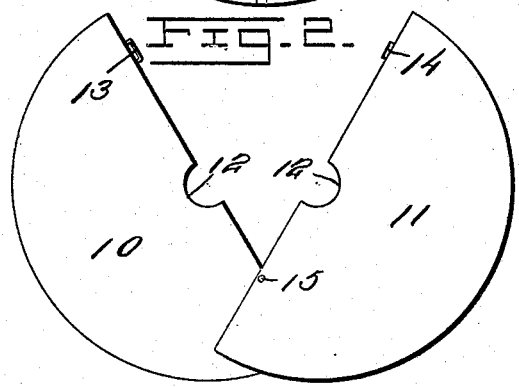
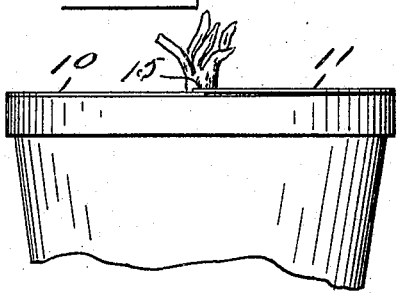

UNITED STATES PATENT OFFICE.

MATILDA SKORNESS, OF APPLETON, MINNESOTA.

FLOWER-POT COVER.

No. 915,897.      Specification of Letters Patent.      Patented March 23, 1909.

Application filed July 23, 1908. Serial No. 445,009.

*To all whom it may concern:*

Be it known that I, MATILDA SKORNESS, a citizen of the United States, residing at Appleton, in the county of Swift and State of Minnesota, have invented certain new and useful Improvements in Flower-Pot Covers, of which the following is a specification.

This invention relates to receptacle closures, and more particularly to closures suitable for pails or flower pots and similar receptacles, and has for its object to provide such an article which may be readily attached to any receptacle.

Another object is to provide one which may be engaged around a plant contained in a pot to be covered.

Another object is to provide such an article in sections to engage over flower pots to prevent the throwing of cigarettes or other injurious matter upon the earth adjacent to the plant contained in the pot, and yet allow free access of air thereto.

Another object is to provide such an article which may be manufactured at extremely low cost from stock material.

Other objects and advantages will be apparent from the following description, and it will be understood that changes in the specific structure shown and described may be made within the scope of the claim, and that any suitable materials may be used without departing from the spirit of the invention.

In the drawings forming a portion of this specification, and in which like numerals of reference indicate similar parts in the several views, Figure 1 is a top plan view of the cover engaged upon a pot and having the stem of a cut plant extending therethrough, Fig. 2 is a view of the sections detached, showing the fastening means, Fig. 3 is a side view of a flower pot having the present invention engaged thereon.

Referring to the drawings, there is shown a cover comprising oppositely disposed sections 10 and 11 pivotally engaged by their adjacent edges and having registering notches 12 forming an opening 12' concentrically of the cover. Fastening pieces 13 and 14 are engaged upon adjacent edges of the opposite sections 10 and 11 oppositely of the pivot 15 and arranged for pivotal engagement as shown.

In use, the cover may be adjusted upon a flower pot by the sections being disengaged and brought into mutual engagement upon opposite sides of the plant contained in the pot, the stem of the plant being adjusted in the opening 12, and the fastening pieces 13 and 14 being brought into engagement.

What is claimed is:—

A cover for flower pots comprising opposite semi-circular plates, each of said plates having a semi-circular notch centrally of its straight edge, said plates being provided with opposed overlapping portions on one side of the opening, a pivot member engaged through said overlapping portions midway between the notches and the peripheries of the plates, and a fastening member carried by each of the plates on its straight edge opposite the pivot member.

In testimony whereof I affix my signature, in presence of two witnesses.

MATILDA SKORNESS.

Witnesses:
     A. S. PERSEN,
     ED. TEW.